United States Patent [19]

Thompson

[11] 4,109,049

[45] Aug. 22, 1978

[54] COLOR DEVELOPING COATING USING UNREFINED CLAYS ON PAPER

[75] Inventor: Thomas D. Thompson, Flemington, N.J.

[73] Assignee: Yara Engineering Corporation, Elizabeth, N.J.

[21] Appl. No.: 680,723

[22] Filed: Apr. 27, 1976

Related U.S. Application Data

[62] Division of Ser. No. 606,975, Aug. 22, 1975, Pat. No. 4,022,735.

[51] Int. Cl.[2] .................................................. B32B 5/16

[52] U.S. Cl. .................................... 428/331; 428/411; 428/511; 428/520; 428/537; 428/538; 428/539; 428/454; 106/214; 106/DIG. 4; 252/168; 282/27.5

[58] Field of Search ......................... 106/214, DIG. 4; 428/411, 537, 511, 520, 538, 539, 331; 260/17, 4 ST, 42, 29.7; 282/27.5; 252/163

[56] References Cited

U.S. PATENT DOCUMENTS

| | | | |
|---|---|---|---|
| 2,885,360 | 5/1959 | Haden, Jr. et al. | 252/163 |
| 2,885,374 | 5/1959 | Swegney | 260/17.4 |
| 4,464,839 | 9/1969 | Gamble | 428/411 X |
| 3,753,761 | 8/1973 | Sugahara et al. | 428/331 X |
| 3,900,216 | 8/1975 | Hayashi et al. | 282/27.5 |
| 3,963,852 | 6/1976 | Baxter | 282/27.5 |
| 4,010,307 | 3/1977 | Camard | 428/539 |

FOREIGN PATENT DOCUMENTS 780,254 3/1968 Canada.

*Primary Examiner*—P. C. Ives

*Attorney, Agent, or Firm*—Buell, Blenko & Ziesenheim

[57] ABSTRACT

A color developing coating and coated paper are provided in which a paper sheet is coated with a mixture of dispersing agent, adhesive and a reactive pigment made up of essentially from the group bentonite and montmorillonite admixed with kaolinite, a polyvalent cation and a ligand.

4 Claims, No Drawings

COLOR DEVELOPING COATING USING UNREFINED CLAYS ON PAPER

This is a division of my copending application Ser. No. 606,975, filed Aug. 22, 1975 now U.S. Pat. No. 4,022,735.

This invention relates to color developing coatings and coated papers and particularly to the production of such coatings and papers for use in pressure sensitive record materials.

The use of color developing coatings for manifold copy systems is not in itself new. Such manifold copy systems have, however, been based upon the use of oxidizing clays and special acid leached bentonites as the basis for the pigment. Such systems are disclosed in U.S. Pat. Nos. 3,753,761; 3,622,364; 3,565,653; 3,455,721; 2,712,507; 2,730,456; 3,226,252; 3,293,060 and Canadian Patent No. 780,254.

These pressure sensitive record materials are frequently termed "carbonless carbon papers" and are, in general highly successful in reproducing copies.

The present invention provides a marked improvement over these prior art pressure sensitive record materials. It provides excellent dye development and light fastness without the necessity of an acid leached bentonite. It provides improved intensity of dye development as compared with present coatings. Improved rheology in the coating mixture results so that it can be coated at high solids on a blade coater. It provides sufficient flexibility so that both image intensity and color can be varied and controlled to a degree unthought of with prior art materials. Finally, but not least in importance, improved coated sheet properties such as brightness, whiteness index, opacity, smoothness and gloss are obtained.

The improved reactive coatings of this invention comprise in combination a polyvalent cation, a ligand, a bentonite or montmorillonite, a kaolinite, a dispersing agent and an adhesive. The preferred polyvalent cation is copper as $CuCl_2$. The preferred ligand is 1,6-hexanediamine. Other polyvalent cations may be used, e.g. Cr, Fe, Co, Ni, Zn and Al preferably as a mineral acid salt such as the chloride. The same is true of the ligand, where other ligands such as gluconic acid, isostearic acid, sodium dimethyl dithiocarbamate, and others may be used. The term bentonite is used generically to describe the unrefined rock from which montmorillonite, a swelling clay, is fractionated. The composition may include extender pigments such as calcium carbonate and water retention aids such as sodium alginate and hydroxyethyl cellulose. Among the dispersing agents which we prefer are sodium hexametaphosphate (e.g. Calgon Corp.'s Calgon), metal salts of polyfunctional oligomer such as the sodium salt of polyfunctional oligomer (e.g. Uniroyal, Inc.'s ND-1 and ND-2) and the sodium salt of polyacrylonides (e.g. Allied Colloids' Dispex N-40). The preferred adhesives or binders are the latex types.

The practice of this invention can perhaps be best understood by reference to the following examples.

Two active clay specimens were prepared and incorporated into a general coating formulation involving the active clay, water, dispersing agent and binder. The two clay samples were as follows:

SAMPLE I

Forty-five grams of montmorillonite was combined with 135 g. of kaolinite and dispersed in 900 g. water. To this mixture, 1.98 g. $CuCl_2$ in 50 g. $H_2O$ was added and allowed to stir for 15 minutes, at which time 0.9 g. 1,6-hexanediamine in 50 g. $H_2O$ was added and allowed to stir for an additional 30 minutes. The slurry was then filtered and dried at 90° C. overnight. The dried filter cake was pulverized three times on a Mikro Samplmill.

The above procedure can be illustrated as follows:

$$\frac{\text{45 g. Montmorillonite} + \text{135 g. Kaolinite}}{\text{900 g. } H_2O} + \frac{\text{1.98 g. } CuCl_2}{\text{50 g. } H_2O} + \frac{\text{0.9 g. 1,6-Hexanediamine}}{\text{50 g. } H_2O}$$

SAMPLE II

This sample was precisely the same as Sample I except that 1.80 grams of 1,6-Hexanediamine was employed.

The above procedure can be illustrated as:

$$\frac{\text{45 g. Montmorillonite} + \text{135 g. Kaolinite}}{\text{900 g. } H_2O} + \frac{\text{1.98 g. } CuCl_2}{\text{50 g. } H_2O} + \frac{\text{1.8 g. 1,6-Hexanediamine}}{\text{50 g. } H_2O}$$

These two clay specimens were evaluated in color coating formulations using Dow Latex 638 as the adhesive and the optimum amounts of different dispersing agents.

The two samples were made down at 62% solids using the optimum amount of dispersant required. The aqueous viscosity data are given in Table I.

TABLE I

Clay-Water Viscosity

| Sample | Dispersing Agent | % D.A. | % Solids | Brookfield Viscosity (cpe) RPM 10 | 100 | Hercules |
|---|---|---|---|---|---|---|
| 1 | Calgon | 0.50 | 62 | 7,000 | 1,640 | 775 rpm |
| 2 | Calgon | 0.50 | 62 | 700 | 193 | 14.5 dynes |
| 1 | ND-1 | 0.45 | 62 | 28,800 | 6.400 | 330 rpm |
| 2 | ND-1 | 0.39 | 62 | 1,680 | 460 | 16.4 dynes |
| 1 | ND-2 | 0.65 | 62 | 4,800 | 1,400 | 540 rpm |
| 2 | ND-2 | 0.35 | 62 | 700 | 200 | 910 rpm |
| 1 | Dispex N-40 | 0.53 | 62 | 4,320 | 1,412 | 560 rpm |
| 2 | Dixpex N-40 | 0.35 | 62 | 900 | 280 | 13.2 dynes |

To the clay-water dispersion, 19.5 g. Dow Latex 638 was added and mixed on a low speed mixer for 5 minutes. At this point, the coating color viscosity measurements were taken.

The coating color viscosities are given in Table II.

TABLE II

Coating Color Viscosity

| Sample | Dispersing Agent | % D.A. | % Solids | Brookfield Viscosity (cpe) RPM 10 | 100 | Hercules dynes |
|---|---|---|---|---|---|---|
| 1 | Calgon | 0.55 | 60 | 3,200 | 896 | 5.4 |
| 2 | Calgon | 0.55 | 60 | 850 | 26 | 2.1 |
| 1 | ND-1 | 0.52 | 60 | 16,800 | 3,328 | 8.8 |
| 2 | ND-1 | 0.45 | 60 | 1,280 | 354 | 2.7 |
| 1 | ND-2 | 0.71 | 60 | 2,120 | 588 | 6.4 |
| 2 | ND-2 | 0.42 | 60 | 440 | 136 | 1.9 |
| 1 | Dispex N-40 | 0.58 | 60 | 1,960 | 524 | 6.2 |

TABLE II-continued

| Coating Color Viscosity | | | | | | | |
|---|---|---|---|---|---|---|---|
| | | | | Brookfield Viscosity | | | |
| Sample | Dispersing Agent | % D.A. | % Solids | 10 | (cpe) RPM | 100 | Hercules dynes |
| 2 | Dispex N-40 | 0.44 | 60 | 520 | | 152 | 2.0 |

The dispersing agents also effected the image intensities and rates of color development as shown in Table III.

TABLE III

| Image Intensity | | | | | | | | | |
|---|---|---|---|---|---|---|---|---|---|
| | | OPTICAL DENSITY | | | | | | | |
| Sample | Dispersing Agent | Immediate CVL | % Redness | 20 min. CVL | % Redness | 1 hr. CVL | % Redness | 24 hrs. CVL | % Redness |
| 1 | Calgon | .642 | 31.6 | .668 | 34.1 | .692 | 37.7 | .710 | 41.5 |
| 2 | Calgon | .574 | 28.2 | .588 | 27.5 | .649 | 32.7 | .771 | 39.0 |
| 1 | ND-1 | .636 | 31.9 | .647 | 34.6 | .694 | 38.3 | .723 | 42.6 |
| 2 | ND-1 | .595 | 28.7 | .624 | 30.0 | .668 | 31.3 | .738 | 36.3 |
| 1 | ND-2 | .625 | 33.0 | .633 | 35.4 | .634 | 39.0 | .692 | 41.9 |
| 2 | ND-2 | .612 | 29.2 | .642 | 30.7 | .673 | 33.0 | .749 | 38.5 |
| 1 | Dispex N-40 | .684 | 35.2 | .694 | 36.7 | .715 | 38.9 | .720 | 42.4 |
| 2 | Dispex N-40 | .584 | 27.7 | .612 | 29.7 | .673 | 32.4 | .736 | 37.0 |

The best dispersing agent appears to be Dispex N-40 because it gives the most rapid image development while maintaining good rheological properties in coating color.

TABLE IV

| Effects of Binders | | | | | | |
|---|---|---|---|---|---|---|
| | Brookfield Viscosity (cpe) RPM | | | | | |
| Binder | 10 | 100 | Hercules dynes | Optical Density 1 hr. | Optical Density 24 hrs. | % Redness 1 hour |
| Starch | 3480 | 992 | 5.6 | .274 | .365 | 31.4 |
| Latex | 40 | 46 | 0.6 | .713 | .723 | 40.0 |

The effects of extender pigments like calcium carbonate have been found to be beneficial when used in certain proportions. This is illustrated in Table V. The several reactive pigments used in this study varied in the percent montmorillonite content.

TABLE V

| Effect of Extenders | | | | | | | | | | | | |
|---|---|---|---|---|---|---|---|---|---|---|---|---|
| | | | Brookfield Viscosity (cpe) RPM | | | % Redness | | | Optical Density | | | |
| Sample | % Montmorillonite | % $CaCo_3$ | 10 | 100 | Hercules dynes | Imm. | 20 min. | 1 hr. | Imm. | 20 min. | 1 hr. | |
| 3 | 15 | 0 | 30 | 40 | 0.4 | 23.3 | 26.0 | 30.1 | .480 | .561 | .617 | |
| | | 25 | 30 | 44 | | 26.6 | 28.5 | 33.9 | .503 | .540 | .683 | |
| | | 40 | 20 | 40 | | 25.3 | 28.5 | 30.6 | .407 | .470 | .502 | |
| 4 | 20 | 0 | 120 | 64 | 0.7 | 24.0 | 28.7 | 34.4 | .524 | .596 | .655 | |
| | | 25 | 120 | 78 | | 28.5 | 31.2 | 37.0 | .586 | .621 | .683 | |
| | | 40 | 100 | 70 | | 25.6 | 30.7 | 34.3 | .496 | .577 | .633 | |
| 5 | 25 | 0 | 300 | 128 | 1.1 | 28.4 | 33.2 | 38.3 | .574 | .626 | .664 | |
| | | 25 | 320 | 144 | | 33.2 | 34.2 | 41.1 | .655 | .698 | .728 | |
| | | 40 | 120 | 80 | | 28.9 | 33.6 | 37.3 | .577 | .660 | .691 | |
| 6 | 30 | 0 | 2120 | 690 | 2.9 | 28.1 | 33.9 | 38.2 | .541 | .602 | .634 | |
| | | 25 | 680 | 252 | | 32.3 | 36.8 | 40.6 | .647 | .687 | .726 | |
| | | 40 | 220 | 92 | | 30.0 | 35.6 | 39.9 | .587 | .674 | .714 | |
| 7 | 35 | 0 | 5120 | 1600 | 5.2 | 31.5 | 35.4 | 38.7 | .558 | .590 | .609 | |
| | | 25 | 1520 | 560 | | 36.7 | 39.2 | 44.2 | .646 | .665 | .692 | |
| | | 40 | 440 | 190 | | 35.5 | 40.7 | 43.2 | .664 | .712 | .740 | |

The effects of different binders were also examined and their influence on image intensity, color and rheology are shown in Table IV. The coating color viscosities are those for a 45% solids coating color. The amounts of binder used were 12% Dow Latex 638 and 16% Stayco M Starch on the weight of pigment.

The effect of other different extender pigments than calcium carbonate on the reactive pigment is illustrated in Table VI.

This table shows that extender pigments, such as hydrous kaolinites, calcined kaolinites, and calcium carbonate, exert only minor influence on rheological properties, but drastically influence image intensity. The calcined clays give the greatest improvement in image intensity.

TABLE VI

Effect of Different Kaolinites $$\frac{45\text{ g. Montmorillonite} + 135\text{ g. Extender}}{900\text{ g. } H_2O} + \frac{1.98\text{ g. } CuCl_2}{50\text{ g. } H_2O} + \frac{0.9\text{ 1,6-Hexanediamine}}{50\text{ g. } H_2O}$$

| | Brookfield Viscosity (cpe) RPM | | | | |
|---|---|---|---|---|---|
| Sample | 10 | 100 | Hercules dynes | Optical Density 1 hour | % Redness |
| Premax (96% less than 2μ kaolin) | 40 | 46 | 0.6 | 0.713 | 40.0 |
| KCS (80% less than 2μ kaolin) | 60 | 52 | 0.6 | 0.678 | 39.2 |
| WP (58% less than 2μ kaolin) | 80 | 64 | 0.6 | 0.711 | 40.2 |
| Astra Plate® (80% less than 2μ kaolin, delaminated) | 100 | 72 | 1.0 | 0.734 | 39.5 |
| Glomax PJD (85% less than 2μ kaolin, | 40 | 52 | 0.8 | 0.829 | 37.0 |

TABLE VI-continued

Effect of Different Kaolinites $\frac{45\text{ g. Montmorillonite} + 135\text{ g. Extender}}{900\text{ g. } H_2O} + \frac{1.98\text{ g. } CuCl_2}{50\text{ g. } H_2O} + \frac{0.9\text{ 1,6-Hexanediamine}}{50\text{ g. } H_2O}$

| Sample | Brookfield Viscosity (cpe) RPM 10 | 100 | Hercules dynes | Optical Density 1 hour | % Redness |
|---|---|---|---|---|---|
| partly calcined) | | | | | |
| Glomax JD (85% less than 2μ kaolin, calcined) | 40 | 52 | 0.8 | 0.858 | 41.8 |
| Atomite (ground calcium carbonate) | 60 | 60 | 0.6 | 0.591 | 35.0 |

The effects of water retention aids were also investigated, and it was found that the Kelgin F (sodium alginate) was better than Cellosize QP-4400 (hydroxyethyl cellulose) in that the Kelgin F did not reduce the image intensity of the pigment and, therefore, resulted in better rheology. Coating colors were made at 55% solids. The results are set out in Table VII.

TABLE VII

Effect of Water Retention Aids

| | Brookfield Viscosity (cpe) RPM 10 | 100 | Hercules dynes | Optical Density 1 hour | % Redness |
|---|---|---|---|---|---|
| Control | 700 | 218 | 2.5 | 0.655 | 36.0 |
| 0.1% HEC | 1200 | 376 | 3.6 | 0.620 | 32.9 |
| 2.0% HEC | 4000 | 1056 | 5.6 | 0.663 | 35.1 |
| 0.4% Sodium Alginate | 4600 | 850 | 2.7 | 0.670 | 35.2 |

Hand sheets were made using a blade applicator. The coat weight on the hand sheet was 3.0 lbs./ream (3300$^2$ ft.).

The hand sheets were evaluated for image intensity and color using a Spectronic 505 densitometer. The image intensity is recorded as the optical density at 6140 Å on the developed sheet minus the optical density at 6140 Å on the undeveloped sheet. The hand sheets were developed first by calendering the sheet using only the pressure of the rolls and then passing the sheets through a second time with a 2 inch square of CB sheet taped on top of the hand sheet or CF sheet. The CB sheet is coated on the backside with microcapsules containing dye precursor of the Michler's hydrol type. The brightness and whiteness index were measured in accordance to the TAPPI procedures. Redness, in all examples set out in this application, is the ratio of the optical density at 5300Å to the optical density at 6140 Å times 100. The redness of the image is of importance because a red image will Xerox better than a blue image.

The effect of changing metal ions on the reactive pigment is set out in Table VIII below:

TABLE VIII

Effect of Metal Ions $\frac{45\text{ g. Montmorillonite} + 135\text{ g. Kaolinite}}{900\text{ g. } H_2O} + \frac{X\text{ g. } MeCl_2}{50\text{ g. } H_2O} + \frac{0.9\text{ g. 1,6-Hexanediamine}}{50\text{ g. } H_2O}$

| | Brookfield Viscosity (cpe) RPM 10 | 100 | Hercules dynes | Optical Density 1 hour | % Redness |
|---|---|---|---|---|---|
| 1. 3.96 g. $CrCl_3 . 6 H_2O$ | 180 | 86 | 6.5 | 0.683 | 52.0 |
| 2. 3.96 g. $FeCl_3 . 6 H_2O$ | 1720 | 236 | 0.9 | 0.747 | 43.6 |
| 3. 3.50 g. $CoCl_2 . 6 H_2O$ | 180 | 80 | 0.6 | 0.713 | 44.7 |
| 4. 3.50 g. $NiCl_2 . 6 H_2O$ | 200 | 80 | 0.6 | 0.691 | 47.0 |
| 5. 1.98 g. $CuCl_2$ | 180 | 64 | 0.7 | 0.642 | 39.2 |
| 6. 1.98 g. $ZnCl_2$ | 260 | 112 | 0.6 | 0.686 | 44.9 |
| 7. 0.99 g. $ZnCl_2$ + 0.99 g. $CuCl_2$ | 80 | 56 | 0.5 | 0.720 | 40.1 |
| 8. 9.90 g. $Al_2(SO_4) . 18 H_2O$ | 100 | 68 | 0.6 | 0.680 | 32.1 |
| 9. 3.60 g. $CuSO_4 . 5 H_2O$ | 80 | 64 | 0.8 | 0.667 | 40.5 |

As shown in Table VIII, the metal ion is capable of effecting the rheology, image intensity, and image color or redness.

The effect of varying the ligand composition is set out in Table IX.

TABLE IX

Effect of Ligands $\frac{45\text{ g. Montmorillonite} + 135\text{ g. Kaolinite}}{900\text{ g. } H_2O} + \frac{1.98\text{ g. } CuCl_2}{50\text{ g. } H_2O} + \frac{X\text{ g. Ligand}}{50\text{ g. } H_2O}$

| Sample | Brookfield Viscosity (cpe) RPM 10 | 100 | Hercules dynes | Optical Density 1 hour | % Redness |
|---|---|---|---|---|---|
| 2.25 g. Tartaric Acid | 19,200 | 3360 | — | 0.677 | 67.7 |
| 1.80 g. 1,6-Hexanediamine | 60 | 46 | 0.9 | 0.663 | 44.9 |
| 5.58 g. Gluconic Acid | 1040 | 328 | 1.8 | 0.568 | 56.7 |
| 3.96 g. Isostearic Acid | 880 | 252 | 1.7 | 0.612 | 44.6 |
| 0.25 g. Sodium Dimethyl Dithiocarbamate | 2760 | 712 | 2.3 | 0.548 | 54.9 |

The influence of the ligand is primarily on the rheological properties. There appears to be no correlation between rheology and imaging intensity and image color or redness.

The effect of varying the concentration of the preferred ligand is set out in Table X.

TABLE X

Effect of 1,6-Hexanediamine Content $$\frac{45\text{ g. Montmorillonite} + 135\text{ g. Calcined Kaolinite}}{900\text{ g. } H_2O} + \frac{1.62\text{ g. } CuCl_2}{50\text{ g. } H_2O} + \frac{X\text{ g. 1,6-Hexanediamine}}{50\text{ g. } H_2O}$$

| 1,6-Hexanediamine | Brookfield Viscosity (cpe) RPM 10 | 100 | HERCULES dynes | Optical Density 1 hour | % Redness |
|---|---|---|---|---|---|
| 0.00 g. | 1920 | 725 | 3.4 | 0.592 | 48.6 |
| 0.36 g. | 720 | 272 | 1.7 | 0.922 | 53.7 |
| 0.72 g. | 240 | 124 | 1.4 | 0.907 | 45.5 |
| 1.08 g. | 60 | 52 | 0.7 | 0.872 | 35.2 |
| 1.44 g. | 30 | 52 | 0.5 | 0.733 | 31.0 |
| 1.80 g. | 30 | 44 | 0.4 | 0.674 | 27.9 |
| 1.62 g. | 10 | 36 | 0.4 | 0.563 | 26.1 |

The redness is greatest with 0.36 g. 1,6-Hexanediamine per 180 g. pigment (0.2%), as well as the highest image intensity. The rheology is substantially improved over that of the acid leached bentonites.

The effect of different bentonites or montmorillonites was also studied and the results are set out in Table XI.

TABLE XI

Effect of Different Bentonites or Montmorillonites $$\frac{45\text{ g. Montmorillonite} + 135\text{ g. Kaolinite}}{900\text{ g. } H_2O} + \frac{1.98\text{ g. } CuCl_2}{50\text{ g. } H_2O} + \frac{1.80\text{ g. 1,6-Hexanediamine}}{50\text{ g. } H_2O}$$

| Sample | Brookfield Viscosity (cpe) RPM 10 | 100 | Hercules dynes | Optical Density 1 hour | % Redness |
|---|---|---|---|---|---|
| Gelwhite ® (Texas betonite from Helms deposit) | 60 | 46 | 0.9 | 0.663 | 44.9 |
| K-4 (Wyoming bentonite from Midwest deposit) | 20 | 44 | 0.2 | 0.698 | 32.4 |
| K-2 (Wyoming bentonite from Brock deposit) | 10 | 38 | 0.4 | 0.768 | 32.0 |
| 910 (Texas bentonite) | 60 | 56 | 0.8 | 0.638 | 30.7 |
| Mississippi (Mississippi bentonite) | 20 | 36 | 0.4 | 0.400 | 32.5 |

The Gelwhite sample has the greatest redness which would Xerox better than the other bentonite samples. Improved Xerox capability means that a sample with greater redness will be reproduced with equal intensity even though its image intensity may be lower than that of a blue sample. The term bentonite is used to refer to a rock, while the term montmorillonite refers to a type of swelling clay recovered by means of fractionating a bentonite. Experiments were carried out using both bentonite and montmorillonite showing that the rheology, image intensity, and image color were the same.

Only the amount of grit in the final samples varied. When the bentonite was used, greater grit or 325 mesh residue was obtained.

The variation of bentonite content and its effect on the reactive pigment are shown in Table XII.

TABLE XII

Effect of Bentonite Content $$\frac{X\text{ g. Montmorillonite} + Y\text{ g. Kaolinite}}{900\text{ g. } H_2O} + \frac{1.98\text{ g. } CuCl_2}{50\text{ g. } H_2O} + \frac{0.9\text{ g. 1,6-Hexanediamine}}{50\text{ g. } H_2O}$$

| Samples | Brookfield Viscosity (cpe) RPM 10 | 100 | Hercules Dynes | Optical Density 1 hour | % Redness |
|---|---|---|---|---|---|
| 15% 27 g. Montmorillonite 85% 153 g. Kaolinite | 30 | 40 | 0.4 | 0.617 | 30.1 |
| 20% 36 g. Montmorillonite 80% 144 g. Kaolinite | 120 | 64 | 0.7 | 0.655 | 34.4 |
| 25% 45 g. Montmorillonite 75% 135 g. Kaolinite | 300 | 128 | 1.1 | 0.664 | 38.2 |
| 30% 54 g. Montmorillonite 70% 126 g. Kaolinite | 2120 | 690 | 2.9 | 0.634 | 38.2 |
| 35% 63 g. Montmorillonite 65% 117 g. Kaolinite | 5120 | 1600 | 5.2 | 0.609 | 38.8 |

Table XII shows that the optimum amount of bentonite with regard to image intensity was obtained with 25% bentonite and 75% kaolinite.

In order to show the improved properties of the reactive pigment as compared with acid leached bentonites, several samples of each were examined in detail with regard to image intensity, image color and rheology.

The aqueous viscosity and coating color viscosity data were obtained on compositions similar to those of the new reactive pigment of this invention but were made down at 45% solids instead of 60% solids. The aqueous viscosity data are set out in Table XIII. The coating color viscosity data are set out in Table XIV. The comparative optical properties appear in Table XV.

TABLE XIII

| Sample | Dispersing Agent | % D.A. | % Solids | cpe Brookfield RPM 10 | 100 | Hercules |
|---|---|---|---|---|---|---|
| | | | | **Clay - Water Viscosity** | | |
| MBF 530 (acid leached bentonite) | Calgon | 6.8 | 45 | 2920 | 1144 | 12.5 dynes |
| MBF 530 | Dispex N-40 | 4.4 | 45 | 4640 | 1808 | 15.6 dynes |
| Silton (acid leached bentonite) | Calgon | 3.5 | 45 | 180 | 148 | 5.0 dynes |
| *Reactive Pigment #1 | Calgon | 0.5 | 62 | 7000 | 1640 | 775 rpm |
| Reactive Pigment #1 | Dispex N-40 | 0.53 | 62 | 4320 | 1412 | 560 rpm |
| **Reactive Pigment #2 | Calgon | 0.5 | 62 | 700 | 193 | 14.5 dynes |
| Reactive Pigment #2 | Dispex N-40 | 0.53 | 62 | 900 | 280 | 13.2 dynes |

*Reactive Pigment #1

$$\frac{45\text{ g. K-4} + 135\text{ g. Premax}}{900\text{ g. }H_2O} + \frac{1.98\text{ g. }CuCl_2}{50\text{ g. }H_2O} + \frac{0.9\text{ g. 1,6-Hexanediamine}}{50\text{ g. }H_2O}$$

**Reactive Pigment #2

$$\frac{45\text{ g. K-4} + 135\text{ g. Premax}}{900\text{ g. }H_2O} + \frac{1.98\ CuCl_2}{50\text{ g. }H_2O} + \frac{1.8\text{ g. 1,6-Hexanediamine}}{50\text{ g. }H_2O}$$

TABLE XIV

| Sample | Dispersing Agent | % D.A. | % Solids | Brookfield RPM 10 | Brookfield Viscosity (cpe) RPM 100 | Hercules |
|---|---|---|---|---|---|---|
| | | | | **Coating Color Viscosity** | | |
| MBF 530 | Calgon | 6.8 | 45 | 28,600 | 6080 | 670 rpm |
| MBF 530 | Dispex N-40 | 4.4 | 45 | 3,920 | 1200 | 5.1 dynes |
| Silton | Calgon | 3.5 | 45 | 80 | 92 | 2.1 dynes |
| Reactive Pigment #1 | Calgon | 0.55 | 60 | 3,200 | 896 | 5.4 dynes |
| Reactive Pigment #1 | Dispex N-40 | 0.58 | 60 | 1,960 | 524 | 6.2 dynes |
| Reactive Pigment #2 | Calgon | 0.55 | 60 | 850 | 25 | 2.1 dynes |
| Reactive Pigment #2 | Dispex N-40 | 0.44 | 60 | 520 | 152 | 2.0 dynes |

TABLE XV

| Sample | Dispersing Agent | Optical Density Immediate | % Redness | Optical Density 20 mins. | % Redness | Optical Density 1 hour | % Redness |
|---|---|---|---|---|---|---|---|
| MBF 530 | Calgon | 0.589 | 51.6 | 0.593 | 52.4 | 0.583 | 53.0 |
| MBF 530 | Dispex N-40 | | | | | 0.536 | 65.3 |
| Silton | Calgon | 0.501 | 77.6 | 0.501 | 80.0 | 0.481 | 82.1 |
| Reactive Pigment #1 | Calgon | 0.642 | 31.6 | 0.668 | 34.1 | 0.692 | 37.7 |
| Reactive Pigment #1 | Dispex N-40 | 0.684 | 35.2 | 0.694 | 36.7 | 0.715 | 38.9 |
| Reactive Pigment #2 | Calgon | 0.574 | 28.2 | 0.588 | 27.5 | 0.649 | 32.7 |
| Reactive Pigment #2 | Dispex N-40 | 0.584 | 27.7 | 0.612 | 29.7 | 0.673 | 32.7 |

The data accumulated from these examples shows that the image intensity is better for the reactive pigment when compared to the acid leached bentonites while the redness appears to be somewhat lower for the active clays.

The term DISPEX N-40 is an Allied Colloid Corporation trademark for sodium polyacrylate and the term Dow Latex 638 is Dow Chemical Company's trademark for their latex adhesive.

While I have illustrated and described certain presently preferred embodiments and practices of my invention it will be understood that this invention may be otherwise embodied within the scope of the following claims.

I claim:

1. A color developing coated paper comprising a paper sheet having applied thereto a coating consisting essentially of a mixture of a dispersing agent, a paper coating adhesive and a reactive pigment consisting essentially of a mixture of a salt of a polyvalent cation, a ligand, kaolinite and a member selected from the group unrefined bentonite and unrefined montmorillonite.

2. A color developing coated paper as claimed in claim 1 wherein the ligand is 1,6-Hexanediamine.

3. A color developing coated paper as claimed in claim 1 wherein the salt of polyvalent ion is $CuCl_2$.

4. A color developing coated paper as claimed in claim 1 wherein the ratio of the member selected from the group bentonite and montmorillonite to kaolinite is in the range 20% to 35% bentonite and montmorillonite to 80% to 65% kaolinite.

* * * * *

UNITED STATES PATENT AND TRADEMARK OFFICE

CERTIFICATE OF CORRECTION

PATENT NO. : 4,109,049

DATED : August 22, 1978

INVENTOR(S) : Thomas D. Thompson

It is certified that error appears in the above-identified patent and that said Letters Patent are hereby corrected as shown below:

On the Title Page, under References Cited, the "Swegney" reference should read --Sweeney--.

On the Title Page, under References Cited, the Gamble patent No. "4,464,839" should be --3,464,839--.

On the Title Page, under References Cited, the "Camard" reference should read --Canard--.

Column 1, line 60, "polyacrylonides" should be --polyacrylamides-

Table III, in the next to the last column, the second number which is ".771" should be --.711--.

Table VI, in the heading, after "0.9" in the last fraction, insert --g.--.

Column 5, Table VI-continued, in the heading, after "0.9" in the last fraction, insert --g.--.

UNITED STATES PATENT AND TRADEMARK OFFICE

CERTIFICATE OF CORRECTION

PATENT NO. : 4,109,049

DATED : August 22, 1978

INVENTOR(S) : Thomas D. Thompson

It is certified that error appears in the above-identified patent and that said Letters Patent are hereby corrected as shown below:

Table XIV, in the subheading, "Viscosity (cpe)" should be deleted above "100 Hercules" and inserted under "Brookfield".

Signed and Sealed this

*Tenth* Day of *April 1979*

[SEAL]

*Attest:*

RUTH C. MASON
*Attesting Officer*

DONALD W. BANNER
*Commissioner of Patents and Trademarks*